United States Patent [19]
Garvin

[11] Patent Number: 6,144,016
[45] Date of Patent: Nov. 7, 2000

[54] HEATING ELEMENT LUNCH BOX

[76] Inventor: Tomika Garvin, 30 Grove Pl., East Orange, N.J. 07017

[21] Appl. No.: 09/336,851
[22] Filed: Jun. 21, 1999
[51] Int. Cl.[7] ..................................................... A21B 1/52
[52] U.S. Cl. ........................ 219/387; 219/429; 220/523; 206/550
[58] Field of Search ................................... 219/387, 429, 219/432, 433; 220/592.23; 206/550, 541, 545

[56] References Cited

U.S. PATENT DOCUMENTS

| D. 340,624 | 10/1993 | Chen . | |
|---|---|---|---|
| 3,811,560 | 5/1974 | Schilling et al. | 206/4 |
| 4,630,671 | 12/1986 | Sherman et al. | 165/61 |
| 4,662,273 | 5/1987 | Marchioni | 99/426 |
| 4,706,817 | 11/1987 | Greathouse | 206/545 |
| 4,830,190 | 5/1989 | Inagaki | 206/550 |
| 4,904,848 | 2/1990 | Colevas . | |
| 4,980,539 | 12/1990 | Walton . | |
| 5,065,867 | 11/1991 | Alfredson . | |
| 5,381,729 | 1/1995 | Hennessy et al. | 99/483 |
| 5,397,875 | 3/1995 | Bechtold, Jr. | 219/521 |

Primary Examiner—Teresa Walberg
Assistant Examiner—Shawntina T. Fuqua
Attorney, Agent, or Firm—Michael I Kroll

[57] ABSTRACT

A temperature insulated lunch box having an upwardly open heated food chamber and an upwardly open unheated food chamber. A cover closes the food chambers. The heated food chamber has a nestable container having a closure. The lunch box includes an electrical circuit including a heating element which is optionally a radiant heating element, a battery, a switch controlling power to the heating element, an externally accessible connector for receiving AC power and a power converter which charges the battery from the AC source. The lunch box has a downwardly open chamber located beneath the food chambers. The downwardly open chamber contains legs which fold out to support the lunch box on an environmental surface, and a tray having pockets for storing cloths and retainers for retaining flatware. The tray is releasably held to the walls of the downwardly open chamber by a spring biased fastener.

22 Claims, 6 Drawing Sheets

HEATING ELEMENT LUNCH BOX

BACKGROUND OF THE INVENTION

1. Field of the Invention

The present invention relates generally to heating and cooling lunch boxes and, more specifically, to a lunch box having electrical means for heating a compartment within said lunch box by means of batteries, or by plugging said lunch box into an electrical outlet or cigarette lighter and having temperature control means. Also said lunch box having a detachable tray-like member providing means for serving the enclosed food items and for storing the removable eating utensils and having storage means for holding napkins and towelettes. In addition said lunch box having foldable and extendable leg members thereunder.

Further said lunch box having a removable container placed within said heating compartment providing means for selectively using the container as a dish and having a cover providing sealing means for said container and having a dry goods compartment providing means for storing such items as snacks and having a compartment with retention means for inserting beverage containers such as a thermos or bottle.

2. Description of the Prior Art

There are other heating and cooling lunch boxes designed to regulate the interior temperature. Typical of these is U.S. Pat. No. 4,830,190 issued to Inagaki on May 16, 1989.

Another patent was issued to Sherman et al. on Dec. 23, 1986 as U.S. Pat. No. 4,630,671. Another U.S. Pat. No. 5,065,867 was issued to Alfredson on Nov. 19, 1991. Another was issued on Oct. 26, 1993 to Chen as U.S. Pat. No. Des. 340,624. Yet another U.S. Pat. No. 4,980,539 was issued to Walton on Dec. 25, 1990 and still yet another was issued on Feb. 27, 1990 to Colevas as U.S. Pat. No. 4,904,848.

U.S. Pat. No. 4,830,190

Inventor: Jitsuo Inagaki

Issued: May 16, 1989

A heating and cooling lunch box which can preserve meals at a suitable temperature for taste a long time depending the type of meals. The lunch box has an outer container, an inner container for forming a healing and heat insulating container and a cooling container engaged with the outer container, heat source and cooling source for heating and/or cooling the heating and heat insulating container and the cooling container, and a cover for covering the upper surface of the inner container. The heat source is adjacent to the heating and heat insulating container, and an air opening for flowing intake air is perforated in the side wall of the outer container. The air opening communicates with a heat source containing chamber for containing the heating composition which produces heat in the presence of said flowing intake air in the heat source containing chamber.

U.S. Pat. No. 4,630,671

Inventor: Victor Sherman et al.

Issued: Dec. 23, 1986

A lunch box has a body, and a vessel filled with a freezable liquid so that the latter cools the interior of the body. Also heating element can be provided for heating the interior of the body part.

U.S. Pat. No. 5,065,867

Inventor: Henry M. Alfredson

Issued: Nov. 19, 1991

This invention pertains to an insulated lunch box that is able to maintain different items such as food and drink at different temperatures. It is composed of two compartments or sections, each able to maintain its contents hot or cold. The lunch box is intended for use when traveling in a vehicle such as an automobile, truck or RV. It is able to use the vehicle's warm hood to heat food. This lunch box can also be used to protect the locks of a vehicle from freezing rain and ice storm by covering and insulating them.

U.S. Pat. No. Des. 340,624

Inventor: Chie-Chou Chen

Issued: Oct. 26, 1993

This United States Patent discloses an ornamental design for a lunch box with a handle as illustrated in the drawings of the patent.

U.S. Pat. No. 4,980,539

Inventor: Charles A. Walton

Issued: Dec. 25, 1990

A portable warming container having an electric heating element, a temperature sensor, a battery, a wire loop, and a control circuit. The wire loop is arranged to charge the battery through the control circuit, and the temperature sensor ultimately controls the current delivered to the heating element from the control circuit and battery.

U.S. Pat. No. 4,904,848

Inventor: Geraldean Colevas

Issued: Feb. 27, 1990

A portable cooling and heating device for cooling and heating foods placed therein is provided including a housing having a bottom wall, a top, a front wall, a rear wall, and side walls. A heating element for heating the foods and a removable cooling element for cooling the foods are positioned in a support which is insertable into and removable from the housing for positioning both the heating element and the cooling element adjacent the food. The heating element being mounted in the support and the cooling element being supported by the support for maintaining an interior of the housing cool prior to heating of the food.

While these heating and cooling lunch boxes may be suitable for the purposes for which they were designed, they would not be as suitable for the purposes of the present invention, as hereinafter described.

SUMMARY OF THE PRESENT INVENTION

A primary object of the present invention is to provide a lunch box having a heating element contained therein for keeping food warm until such time as it is needed.

Another object of the present invention is to provide a lunch box having a heating element contained therein for keeping food warm within a designated compartment and having switch connection means for turning said heating element on and off.

Yet another object of the present invention is to provide a lunch box having a heating element contained therein for keeping food warm within a designated compartment and having switch connection means for turning said heating element on and off and electrical connection means providing alternate means for the electrical needs of the heating compartment.

Still yet another object of the present invention is to provide a plurality of compartments for the segregated storage of items which can be physically altered by other items contained within said lunch box such as cookies being crushed by a thermos.

Yet another object of the present invention is to provide a detachable and storable serving tray having retention means for the storage of removable eating utensils and a plurality of pockets thereon for the storage of napkins or towelettes.

Still yet another object of the present invention is to provide a lunch box having foldable and extendable leg members attached thereunder.

Additional objects of the present invention will appear as the description proceeds.

The present invention overcomes the shortcomings of the prior art by providing a lunch box having a plurality of compartments wherein one or the compartments is encompassed by an electrical heating element having various means for supplying the electrical needs of said heating compartment and said lunch box having a detachable bottom tray-like member providing means for serving the enclosed food items and for storing the removable eating utensils and having pockets for holding napkins and towelettes. In addition said lunch box having foldable and extendable leg members thereunder.

Further said lunch box having a removable container placed within said heating compartment providing means for selectively using the container as a dish and having a cover providing sealing means for said container and having a dry goods compartment providing means for storing such items as snacks and having a compartment with retention means for inserting beverage containers such as a thermos or bottle.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which:

FIG. 1 is a perspective view of the present invention in use. Shown is the lunch box in the open position having a number of compartments for storing different food items. Shown is a heating compartment having a removable food storage container with a sealable removable lid, a beverage container compartment and a snack compartment for dry goods. Also shown are electrical connection means and on/off switch for the heating element within the heating compartment;

FIG. 2 is an exploded perspective view of the members of the preferred embodiment of the present invention. Shown is a lunch box having electrical connection means for heating a portion of the lunch box and a control switch for turning said heating means on and off. Also shown is a detachable container member for storing the food to be heated as well as a cover for sealing said container and a removable bottom tray-like member having a spring-like button release mechanism providing attachment means. In addition said tray-like member having means for holding eating utensils and pockets for storing napkins and towelettes;

FIG. 3 is cross sectional view of the lunch box taken from within the heating compartment. The heating compartment is comprised of an electrical supply source, herein being batteries, for energizing a heating coil which encompasses the heating compartment. Also shown in a folded position are extendable leg members. Further shown is a removable tray-like member having eating utensils attached thereon and having a button locking and release mechanism providing means for securing and selectively removing said tray-like member;

Figure 6:
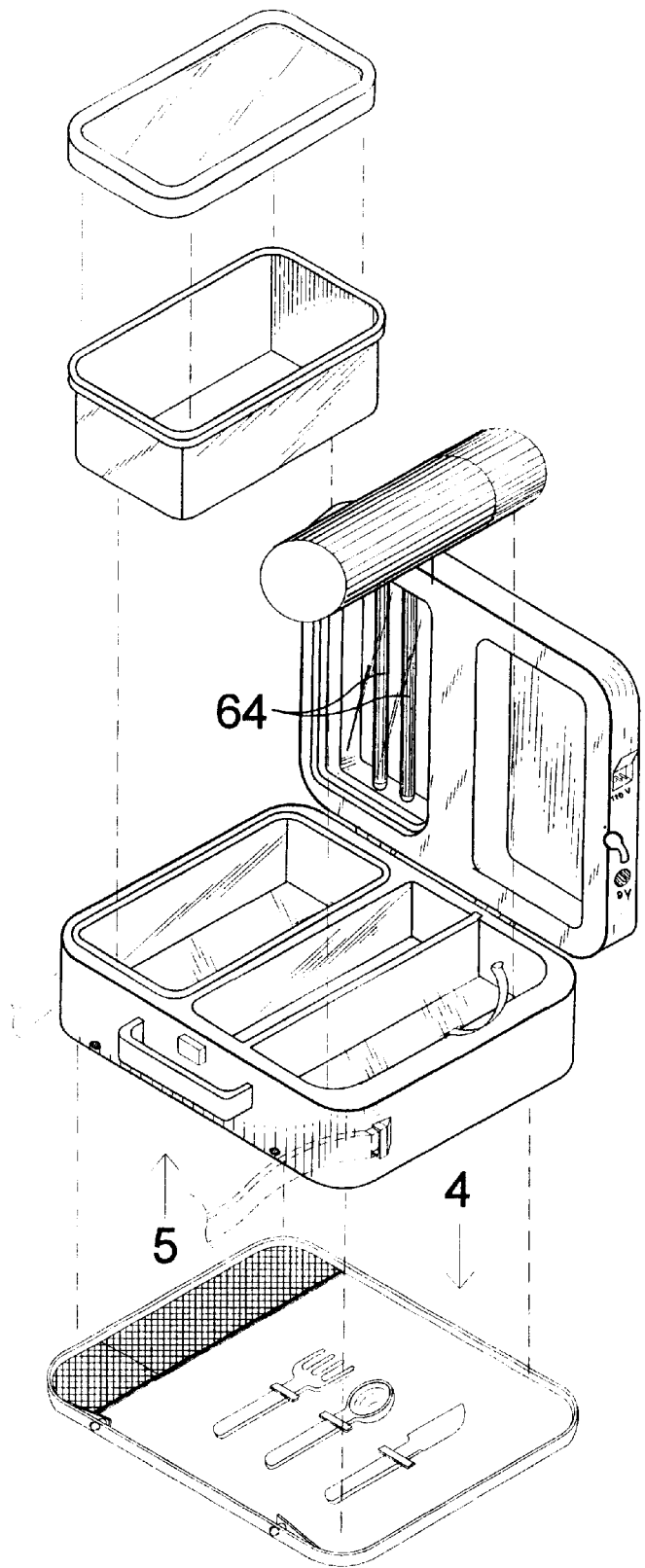
Figure 7:
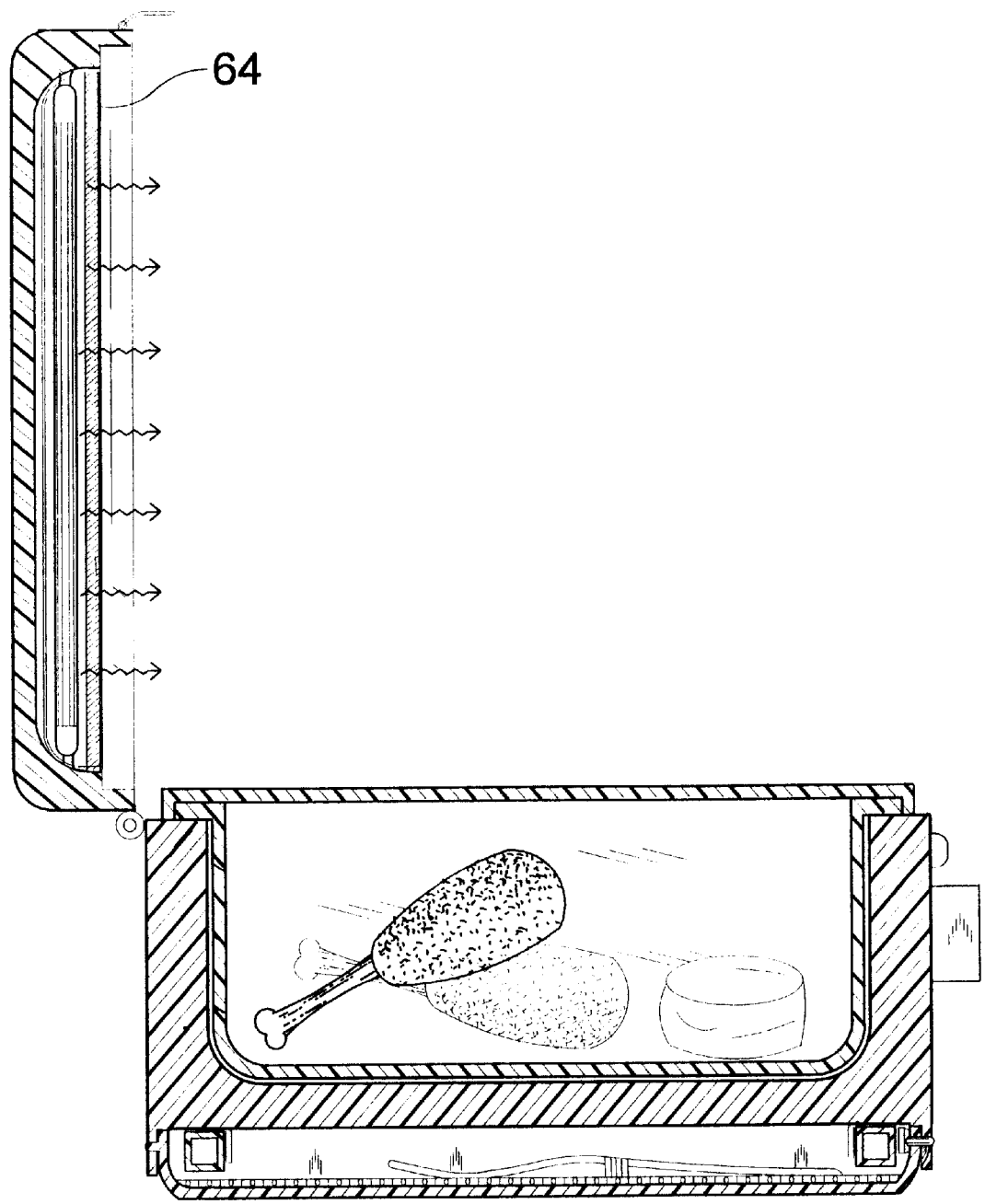

FIG. 6 is an alternate embodiment of the lunch box having a heating lamp as the source of heat for the heating compartment. Also shown are electrical connection means providing alternate sources of energy for running said heating lamp and a plurality of foldable and extendable leg members. Further shown is a removable tray-like member having eating utensils removably attached thereon and a number of pockets for the storage of napkins and towelettes and said removable tray-like member having hook and loop material for securing said tray-like member into a cavity within the lunch box; and FIG. 7 is cross sectional view of the alternate embodiment of the present invention, taken from FIG. 6 as indicated showing the heating lamp providing an amount of heat into a compartment having a selectively removable container and lid. Also shown is a removable tray-like member having eating utensils attached thereon and having hook and loop material forming means of attachment of said tray-like member to said lunch box.

DETAILED DESCRIPTION OF THE PREFERRED EMBODIMENTS

Figure 1:
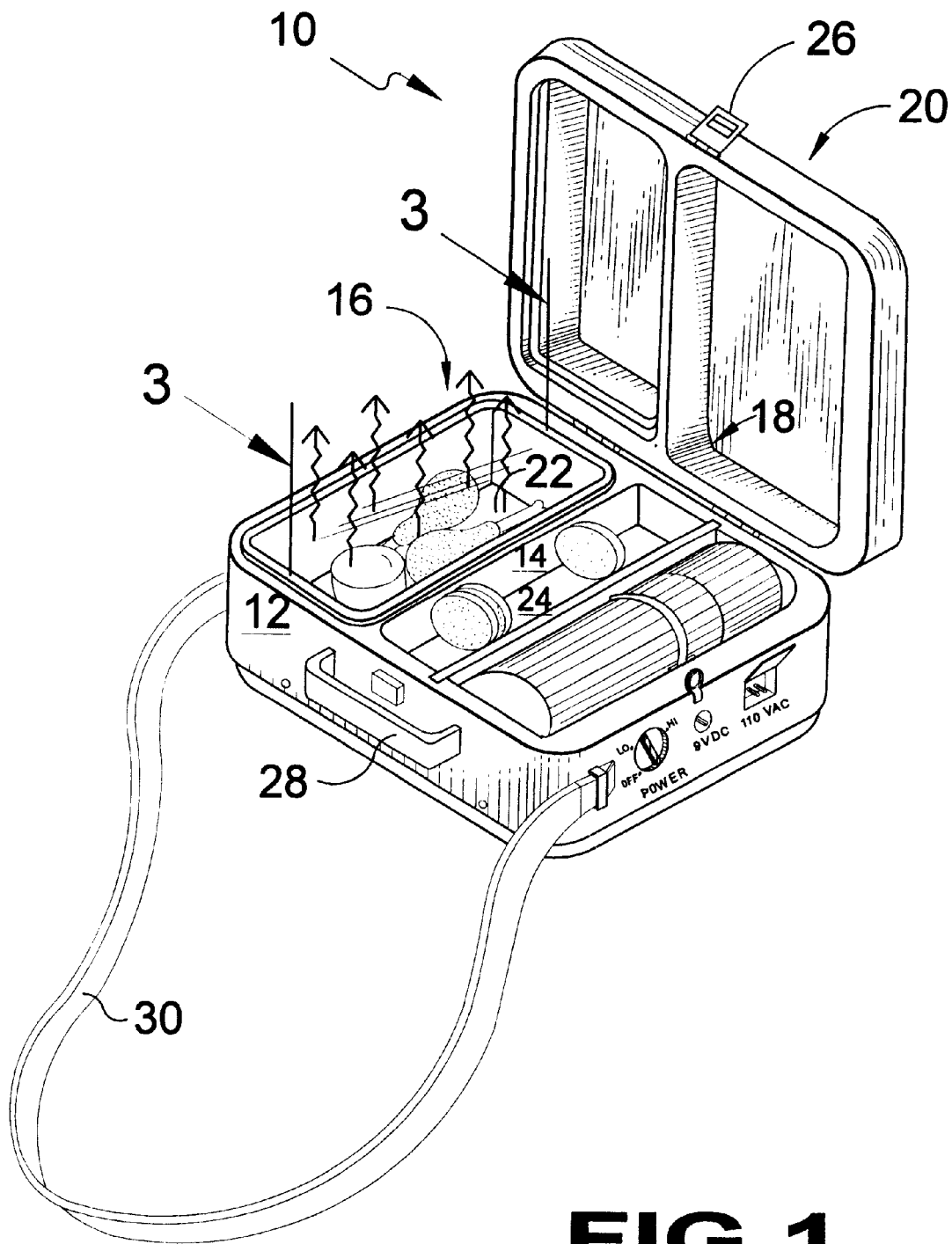
Figure 2:
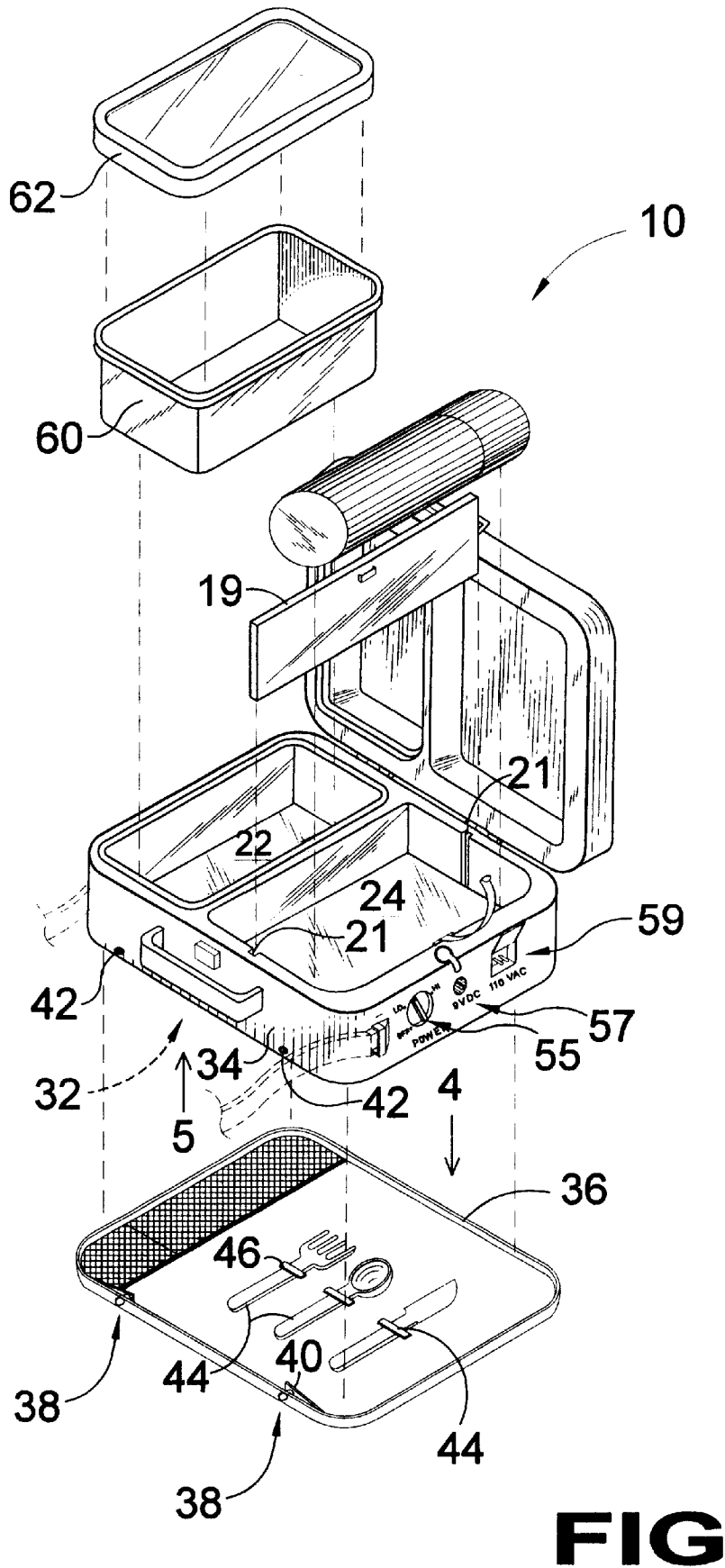

FIG. 1 of the drawings illustrates novel lunch box 10, which is seen to have an upstanding peripheral wall 12, a dividing wall 14, and two internal chambers 16, 18 for carrying food. Chambers 16, 18 open upwardly, and are closed by a cover 20. Chambers 16, 18 each have a floor 22 or 24 from which projects walls 12, 14. Cover 20 has a manually removable attachment element in the form of latch 26. Latch 26 is disposed to engage and be manually released from engagement with wall 20 of chambers 16, 18. Lunch box 10 further includes a carrying handle 28 and a carrying strap 30, both fixed to wall 20. Handle 28 is small in length relative to carrying strap 30, and also is rigid. Carrying strap 30 is much greater in length, and is flexible. Provision of both assures maximal convenience when carrying lunch box 10. Turning now to FIG. 2, it will be seen that chamber 18 has a removable divider 19. Wall 12 has internal grooves 21 for slidably receiving divider 19. Lunch box 10 has a downwardly open chamber 32 disposed beneath chambers 16, 18. Chamber 32 has a peripheral wall 34 projecting below floors 22, 24 of chambers 16, 18. Wall 34 is an extension of wall 12. Chamber 32 is occupied by a tray 36 which is dimensioned and configured to be received and held within chamber 32. Tray 36 has a manually releasable engagement element selectively securing tray 36 within and releasing tray 36 from chamber 32. This engagement element preferably takes the form of projections 38 each mounted on an associated spring arm 40 biased to urge its respective projection 38 into locking engagement with wall 34. Holes 42 are formed in wall 34 to receive projections 38. Tray 36 is released from engagement by depressing projections 38 from engagement with holes 42.

Tray 36 holds peripheral articles which are useful when eating. These articles may include fork, spoon, and knife, which are referred to herein as flatware 44. Retainers in the form of bands 46 encircle and retain flatware 44.

Figure 4:
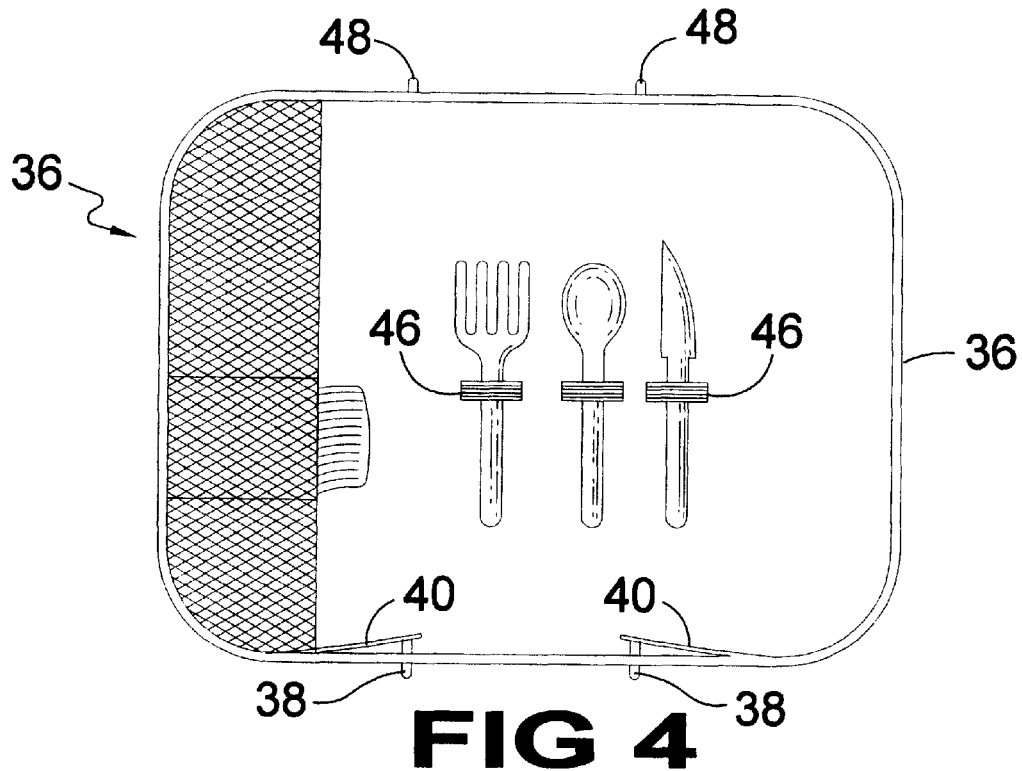
FIG. 4 is a top plan view of the removable tray-like member having several types of eating utensils removably secured thereon and a plurality of pockets for the storage of napkins and towelette towels. Also shown is a button locking and release mechanism for holding the tray-like member in a cavity located on the bottom of the lunch box.

FIG. 4 clearly shows the nature of the engagement elements holding tray 36 in place. In addition to projections 38 and spring arms 40, additional projections 48 are inserted into holes (not shown) formed at the opposite side of wall 34 (see FIG. 2) than that bearing holes 42 (see FIG. 2).

Figure 5:
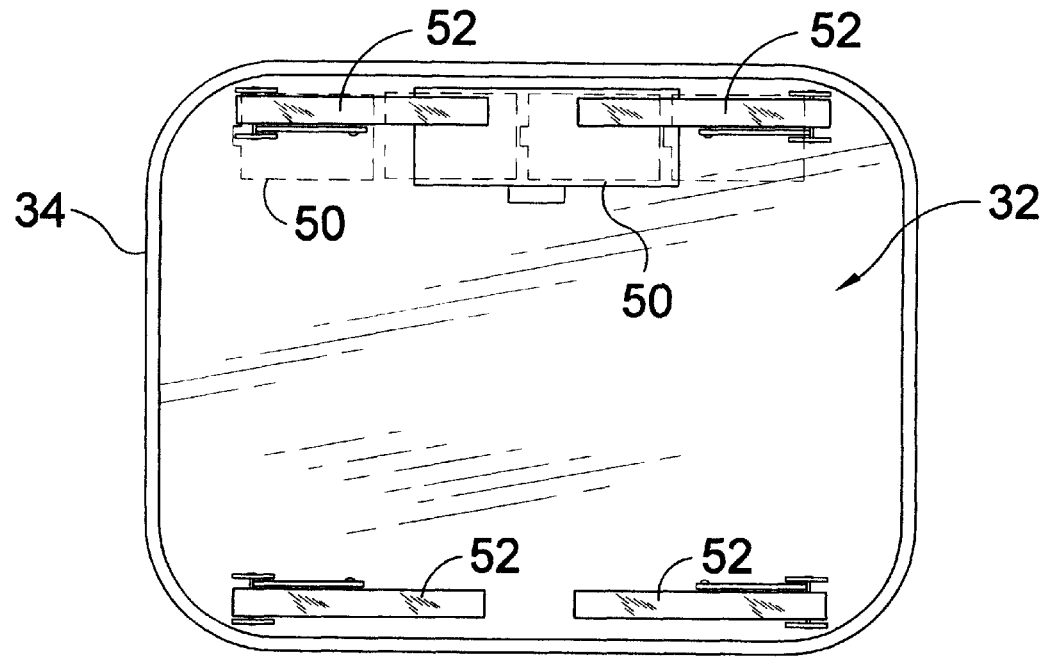
FIG. 5 is a bottom plan view of the cavity within the lunch box having a plurality of foldable and extendable leg members. Also shown, is an access panel to a battery compartment having a number of batteries, shown in outline, contained therein.

FIG. 5 shows additional features of tray 36. One feature is pockets 50 formed on tray 36, which pockets 50 are suitable for receiving and retaining cloths, napkins, and the like (not shown). Another feature is legs 52, which are foldable or collapsible. Legs 52 open into a deployed position wherein legs 52 project downwardly from chamber 32 when chambers 16, 18 are oriented to open upwardly, to support lunch box 10 above an environmental surface (not shown). When folded or collapsed, legs 5.2 move into a stowed position wherein legs 52 are contained within chamber 32.

Turning back to FIG. 3, one of the significant features of lunch box 10 is shown. Food 54 placed in chamber 16 is heated by electrical beating elements 56 disposed within wall 12. Heat is shown radiating laterally into chamber 16. Elements 56 are supplied with power from battery 58, which is connected to elements 56 by suitable conductors or circuitry (not shown). The circuitry includes a switch 55 for controlling power flowing to elements 56 and two externally accessible power receptacles 57, 59. Switch 55 includes an externally accessible control element, such as knob 61. The major electrical components are best seen in FIG. 2. Receptacle 57 receives power from a suitable DC source, such as from a cable connected to a motor vehicle electrical system (not shown). Receptacle 59 is arranged to receive AC power, such as 120 volt, single phase AC power. The circuitry includes a power converter suitable for converting AC power to DC power, and necessary conductors operably connecting receptacles 57 and 59, switch 55, and the power converter.

To accommodate heating in chamber 16 and also maintenance of low temperatures in adjacent chamber 18, walls 12 and 34 and floors 22, 24 are formed from insulating material. Although depicted as synthetic resin, it will be understood that any natural or synthetic material having requisite strength and ability to retard transfer of heat into and out of chambers 16, 18, such as ceramics, will be suitable as a constituent material.

Figure 3:
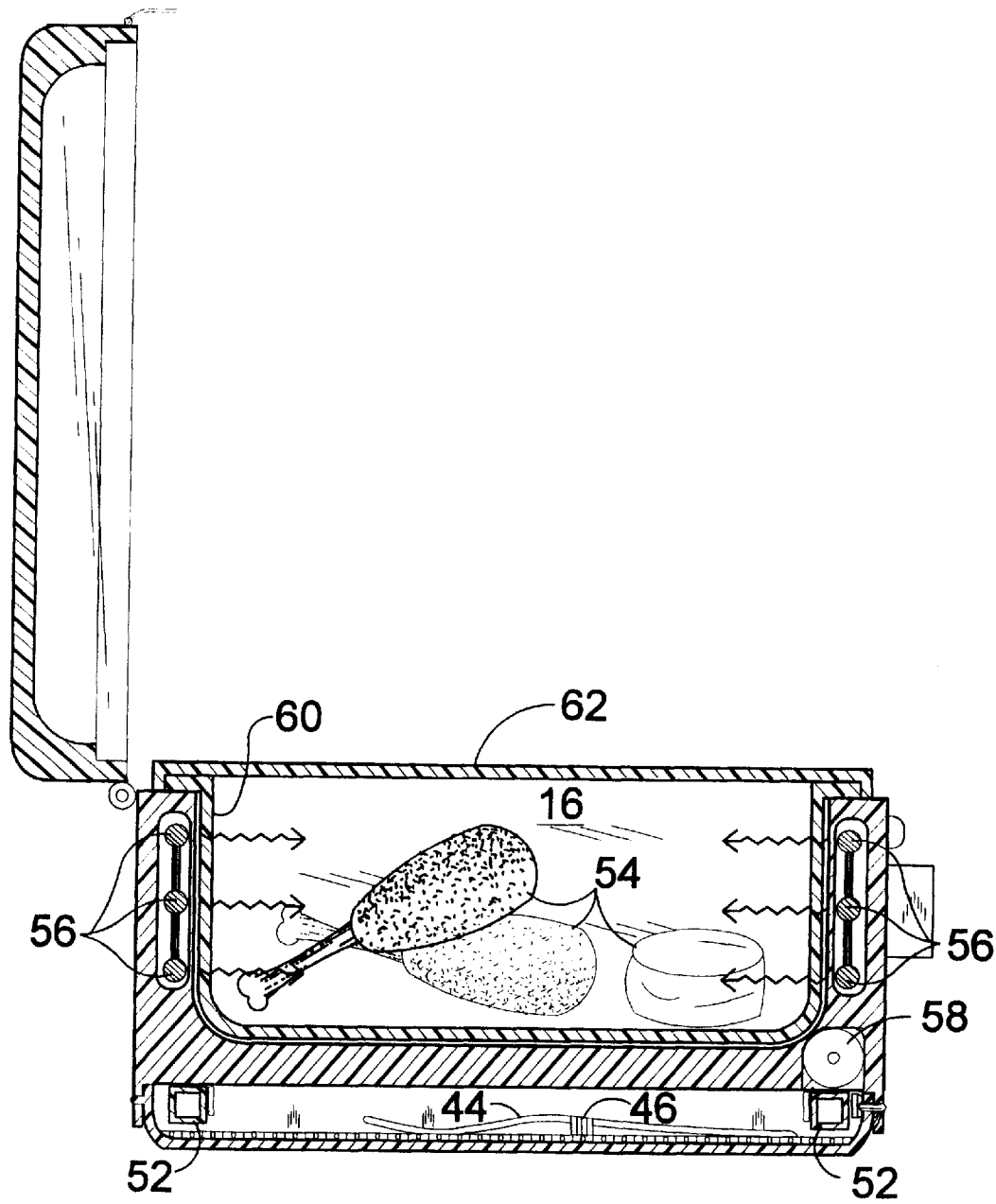

FIG. 3 illustrates a further feature of lunch box 10, that of a removable container 60 (see FIG. 2) dimensioned and configured to be received and stored within said first internal chamber. Container 60 has a cover 62 dimensioned and configured to close and adhere to container 60 and to be received within chamber 16 when cover 62 is installed on container 60.

FIG. 6 illustrates an alternative embodiment of the invention wherein the heating element is in the form of radiant heating elements 64 which emit both visible light and heat energy in invisible form. In the embodiment of FIG. 3, heating elements 56 are of conventional electrical resistive type which emit heat without glowing, and are disposed in wall 12 of lunch box 10. In the embodiment of FIG. 6, heating elements 64 are located in cover 20, and heat contents of chamber 16 from above. This is also shown in FIG. 7.

I claim:

1. A lunch box having
   a first internal chamber for carrying food, wherein said first internal chamber opens upwardly and has a floor and a first peripheral wall projecting upwardly from said floor, and wherein said lunch box includes insulating material disposed to retard transfer of heat into and out of said first internal chamber,
   a first cover having a manually removable attachment element disposed to engage and be manually released from engagement with said peripheral wall of said first internal chamber,
   a downwardly open chamber disposed beneath said first internal chamber, wherein said downwardly open chamber has a peripheral wall projecting below said floor of said first internal chamber, and
   legs having means for moving between a stowed position wherein said legs are contained within said downwardly open chamber and a deployed position wherein said legs project downwardly from said downwardly open chamber when said first internal chamber is oriented to open upwardly.

2. The lunch box according to claim 1, further comprising means for heating said first internal chamber.

3. The lunch box according to claim 2, wherein said heating elements are disposed within said first peripheral wall of said first internal chamber.

4. The lunch box according to claim 2, wherein said heating elements are disposed within said first cover of said first internal chamber.

5. The lunch box according to claim 2, wherein said means for heating said first internal chamber comprise an electrical heating source, a battery, and circuitry connecting power from said battery to said electrical heating source.

6. The lunch box according to claim 5, wherein said circuitry includes an external terminal disposed to receive power from an external source and to conduct power from the external source to said heating source.

7. The lunch box according to claim 6, wherein said circuitry includes a power converter disposed to receive alternating current power from said external source and to charge said battery from said power converter.

8. The lunch box according to claim 5, wherein said circuitry includes a switch for controlling said electrical heating source, said switch having an externally accessible control element.

9. The lunch box according to claim 5, wherein said electrical heating source is a resistive heating element.

10. The lunch box according to claim 5, wherein said electrical heating source comprises a radiant heater which emits both visible light and heat energy in invisible form.

11. The lunch box according to claim 1, further comprising a removable container dimensioned and configured to be received and stored within said first internal chamber.

12. The lunch box according to claim 11, wherein said removable container has a second cover dimensioned and configured to close and adhere to said container and to be received within said first internal chamber when said cover is installed on said container.

13. The lunch box according to claim 1, further comprising an upwardly open second internal chamber for carrying food disposed beside said first internal chamber, wherein said heating source is arranged to heat only said first internal chamber when operating.

14. The lunch box according to claim 13, wherein said second internal chamber has a divider and said peripheral wall has internal grooves for slidably receiving said divider.

15. The lunch box according to claim 1, further comprising a tray dimensioned and configured to be received and held within said downwardly open chamber, wherein said tray has a manually releasable engagement element selectively securing said tray within and releasing said tray from said downwardly open chamber.

16. The lunch box according to claim 15, wherein said manually releasable engagement element comprises a projection and a spring biased to urge said projection into locking engagement with said wall of said downwardly open chamber.

17. The lunch box according to claim 15, wherein said tray has means for retaining flatware.

18. The lunch box according to claim 15, wherein said tray has pockets formed thereon, for receiving and retaining cloths.

19. The lunch box according to claim 1, further comprising a carrying handle fixed to said first peripheral wall of said first internal chamber.

20. The lunch box according to claim 1, further comprising a carrying strap fixed to said first peripheral wall of said first internal chamber.

21. A lunch box having:
- a first internal chamber for carrying food, wherein said first internal chamber opens upwardly and has a floor and a first peripheral wall projecting upwardly from said floor, and wherein said lunch box includes insulating material disposed to retard transfer of heat into and out of said first internal chamber, and a first cover having a manually removable attachment element disposed to engage and be manually released from engagement with said peripheral wall of said first internal chamber;
- heating elements disposed to heat said first internal chamber, a battery, circuitry connecting power from said battery to said electrical heating source, an external terminal disposed to receive power from an external source and to conduct power from the external source to said heating source, a power converter disposed to receive alternating current power from said external source and to charge said battery from said power converter, and a switch for controlling said electrical heating source, said switch having an externally accessible control element;
- an upwardly open second internal chamber disposed beside said first internal chamber, wherein said heating source is arranged to heat only said first internal chamber when operating;
- a downwardly open chamber disposed beneath said first internal chamber and said second internal chamber, wherein said downwardly open chamber has a peripheral wall projecting below said floor of said first internal chamber and said second internal chamber;
- legs having means for moving between a stowed position wherein said legs are contained within said downwardly open chamber and a deployed position wherein said legs project downwardly from said downwardly open chamber when said first internal chamber is oriented to open upwardly;
- an upwardly open second internal chamber for carrying food disposed beside said first internal chamber, wherein said heating source is arranged to heat only said first internal chamber when operating;
- a downwardly open chamber disposed beneath said first internal chamber and said second internal chamber, wherein said downwardly open chamber has a peripheral wall projecting below said floor of said first internal chamber and said second internal chamber;
- legs having means for moving between a stowed position wherein said legs are contained within said downwardly open chamber and a deployed position wherein said legs project downwardly from said downwardly open chamber when said first internal chamber is oriented to open upwardly;
- a removable container dimensioned and configured to be received and stored within said first internal chamber, wherein said removable container has a second cover dimensioned and configured to close and adhere to said container and to be received within said first internal chamber when said cover is installed on said container;
- wherein said second internal chamber has a divider and said peripheral wall has internal grooves for slidably receiving said divider.

22. The lunch box according to claim 21, wherein said heating elements are radiant heaters which emit both visible light and heat energy in invisible form, and are disposed within said first cover of said first internal chamber.

* * * * *